United States Patent [19]
Kato et al.

[11] Patent Number: 5,653,948
[45] Date of Patent: Aug. 5, 1997

[54] METHOD FOR CALCINING FINE LIMESTONE POWDER

[75] Inventors: Kunio Kato, Kiryuu; Sozo Nakazawa, Kuzuu-machi, both of Japan

[73] Assignee: Yoshizawa Sekkai Kogyo Kabushiki Kaisha, Tokyo, Japan

[21] Appl. No.: 744,064

[22] Filed: Nov. 4, 1996

Related U.S. Application Data

[63] Continuation of Ser. No. 418,285, Apr. 7, 1995.

[51] Int. Cl.$^6$ .................................................. C01F 11/06
[52] U.S. Cl. ............................................. 423/177; 423/637
[58] Field of Search ..................................... 423/175, 177, 423/637

[56] References Cited

U.S. PATENT DOCUMENTS

| | | | |
|---|---|---|---|
| 2,774,661 | 12/1956 | White | 423/175 |
| 3,862,294 | 1/1975 | Engelhart et al. | 423/175 |
| 4,389,381 | 6/1983 | Dinovo | 423/175 |

OTHER PUBLICATIONS

"Pyrolysis of Yallourn Coal in a Powder-Particle Fluidized Bed", Takarada et al, *Fuel*, vol. 71, Oct. 1992, pp. 1087–1092.

"Reduction of Iron Oxide Fine Particles from a Converter in a Powder-Particle Fluidized Bed", Takarada et al, *Chemical Engineering Reports*, vol. 19, No. 3, pp. 505–510.

"Effective Dry Desulfurization by a Powder-Particle Fluidized Bed", Kato et al, *Journal of Chemical Engineering of Japan*, vol. 27, No. 3, (1994), pp. 276–278.

*Primary Examiner*—Wayne Langel
*Attorney, Agent, or Firm*—Nikaido Marmelstein Murray & Oram LLP

[57] ABSTRACT

Method and apparatus for obtaining finely pulverized quicklime powder having high reactivity by calcining fine limestone powder, particularly, of particle sizes 1–100 micrometers. Coarse particles of inert substance, particularly, those having diameters of 100–1500 micrometers, are fluidized with high temperature gas to form a fluidized bed, and fine limestone powder is supplied into the fluidized bed. The fine limestone powder captured by the fluidized bed is calcined therein and the resulting quicklime powder is carried away by the stream of fluidizing gas and recovered with cyclone and bag filter. Coarse limestone may be used instead of or together with the coarse inert substance particles.

4 Claims, 1 Drawing Sheet

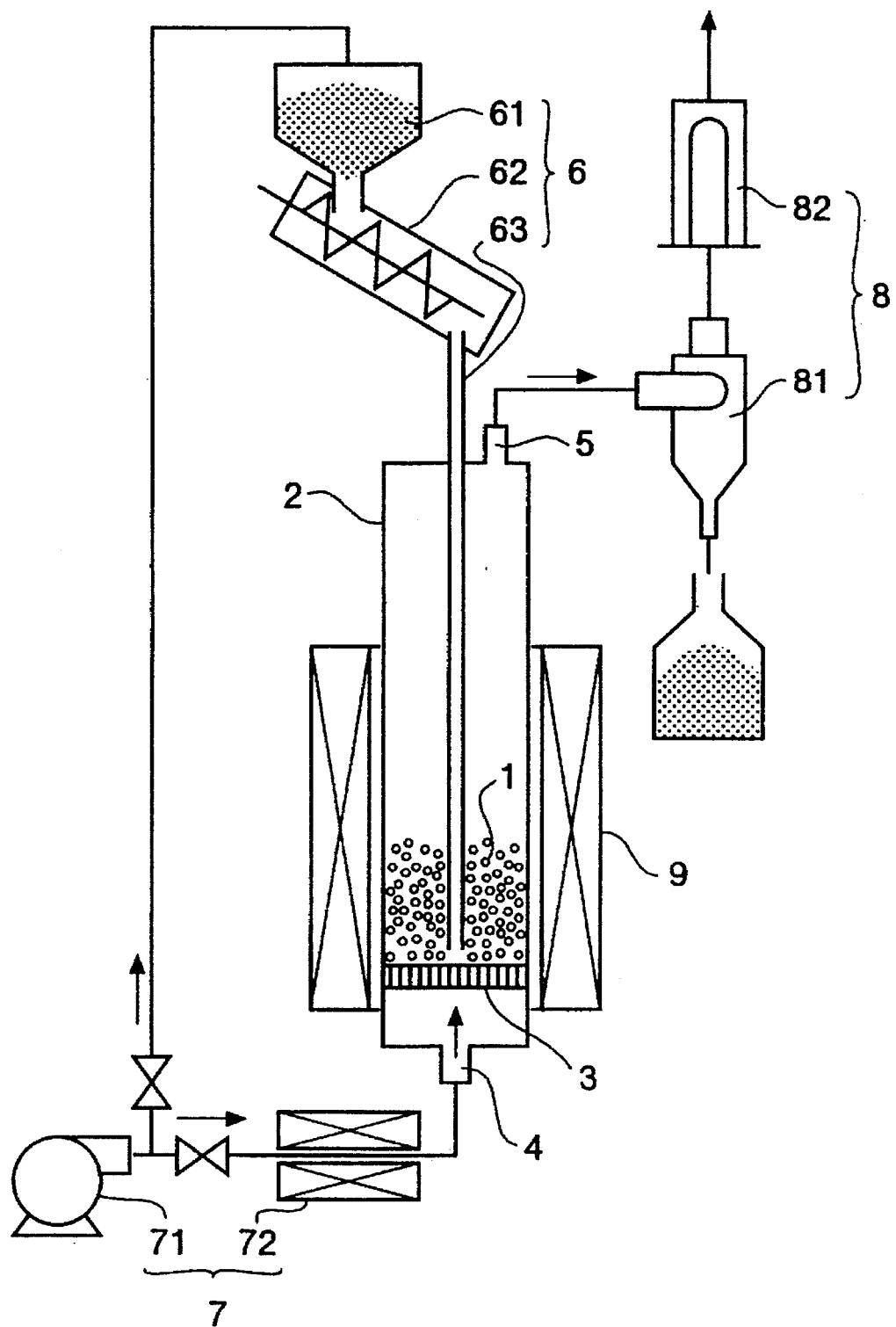
FIGURE

METHOD FOR CALCINING FINE LIMESTONE POWDER

This application is a continuation of application Ser. No. 08/418,285, filed Apr. 7, 1995.

BACKGROUND OF THE INVENTION

1. Field in the Industry

The present invention concerns a method of calcining fine limestone powder, particularly, those having particle size of 100 micrometers or less to produce reactive quicklime. The invention concerns also an apparatus for practicing the method.

In this specification, the term "limestone" is used in the meaning including $CaCO_3$ and dolomite, i.e., an ore in which $MgCO_3$ coexist with $CaCO_3$.

2. State of the Art

Production of quicklime by calcining limestone is usually carried out using a shaft kiln or a rotary kiln. These apparatus for calcining are suitable for calcining limestone in the form of lumps having diameters of several to tens millimeters and it is difficult to calcine granular or powder limestone having diameters of several millimeters or less. It is, however, inevitable that fine powder occurs at shredding and calcining limestone. Efforts for collecting fine limestone dusts from the view not to pollute the environment increase the amount of recovered fine powder. Further, rinsing of the shredded limestone is often carried out prior to calcination for the purpose of improving the product quality, and the sludge occurring from rinsing is a source of fine limestone powder.

On the other hand, quicklime in the form of fine powder is a preferable product in various usage because of high reactivity thereof. For example, fine quicklime powder is a useful material for producing ceramics having CaO as the main component. Also, it is used as a secondary raw material for iron making and steel making, or a neutralizing agent for an acidic gas or acidic water.

There has been, however, no practical method of calcining powdery limestone, particularly, fine powder of diameter of 1 mm or less.

SUMMARY OF THE INVENTION

The object of the invention is, in view of the present status of the technology, to provide a method of calcining fine limestone powder with high calcination rate to produce fine quicklime powder, and to provide an apparatus for carrying out the method.

BRIEF EXPLANATION OF THE DRAWING

The FIGURE is a schematic vertical section view of an experimental fluidized bed calcining apparatus according to the invention.

DETAILED EXPLANATION OF THE PREFERRED EMBODIMENTS

An embodiment of the present method of calcining fine limestone powder comprises: forming a fluidized bed by fluidizing coarse inert substance particles in a particle range of 100–1500 micrometers with a high temperature gas; charging continuously or intermittently fine limestone powder in a particle range of 1– 100 micrometers into the fluidizing bed for calcination; and recovering the resulting fine quicklime powder by separating it from the gas coming from the fluidized bed with a solid/gas separator.

As the coarse inert substance particles silica sand, which is substantially not reactive to the formed CaO under the calcination conditions, is preferable.

As the high temperature gas, air indirectly warmed by electrical heating or combustion may be of course used, if it is not unpayable due to the energy costs. $CO_2$ concentration in the high temperature gas should not be so high in view of the equilibrium of the reaction $CaCO_3$—$CaO+CO_2$, and also it is necessary to avoid a high $H_2O$ concentration because $H_2O$ react with formed CaO in accordance with the reaction $CaO+H_2O$—$Ca(OH)_2$. Both progress of the above decomposition reaction and prevention of the hydration reaction can be realized at a high temperature of 750° C. or higher, particularly, 850° C. or higher without substantial problems. Thus, it is possible to use combustion gases generated by combusting various fuels such coal-based fuels or petroleum-based fuels.

If necessary for maintaining temperature of the fluidized bed it is possible to inject all the quantity or supplemental quantity of the fuel (such as dust coal or petroleum-based liquid fuel) just under or into the fluidized bed. If danger of explosion can be avoided, gaseous fuel can also be used.

Another embodiment of the present method of calcining fine limestone powder comprises forming a fluidized bed by fluidizing coarse limestone particles in a particle range of 100–1500 micrometers with a high temperature gas; charging continuously or intermittently fine limestone powder in a particle range of 1–100 micrometers into the fluidizing bed; replenishing the coarse limestone particles in a particle range of 100–1500 micrometers to the fluidized bed as the coarse limestone particles is consumed; and recovering the resulting fine quicklime powder by separating it from the gas coming from the fluidized bed with a solid/gas separator.

It is possible to practice a still other embodiment which is a combination of the above described two embodiments, i.e., coarse inert substance particles of particle range 100–1500 micrometers coexist in the fluidized bed of coarse limestone particles.

In any embodiment it is not preferable to release the heat retained in the high temperature gas, and therefore, it is recommended to arrange heat exchange between the high temperature gas and the gas and/or the materials to be introduced in the fluidizing-calcining tower so as to recover at least a portion of the heat.

The apparatus of the present invention for calcining fine limestone powder comprises, as seen from FIG. 1 which illustrates an experimental apparatus, a fluidizing-calcining tower 2 having a perforated plate 3 at a lower part thereof, a gas-inlet 4 at the bottom thereof, a gas-outlet 5 at the top thereof, thereby to form a fluidized bed 1 in which coarse inert substance particles or coarse limestone particles and fine limestone powder are mixed and fluidized; means 6 for supplying fine limestone powder to the fluidized bed; means 7 for introducing a high temperature gas into the tower; and means 8 for solid/gas separating for recovering solid components in the gas from the fluidized bed.

As the means for solid/gas separation combination of a cyclone 81 and a bag filter 82 or an electric precipitator is preferably used.

In any case of forming the fluidized bed, i.e., with the coarse inert substance particles,-with the coarse limestone particles or with both of the coarse particles, it is possible to use the means for supplying fine limestone powder as the means for replenishing the coarse particles of the fluidized bed. In some cases, however, it may be preferable to use separate means for supplying the coarse particles and fine powder.

It has been tried to utilize fluidized bed for calcining fine limestone powder. The reason for the failure of calcining attributes to the difficulty in uniform fluidizing in a gas-solid system due to the fact that coagulation between particles is very strong in fine powder, particularly, those of diameters of 30 micrometers or less.

The present invention overcame the difficulties by using coarse particles of 100 micrometers or larger which do not coagulate mutually to form a fluidized bed and supplying the fine limestone powder so as to prevent the mutual coagulation between the fine particles, and thus succeeded in maintaining the fine powder in the form of the primary particles (particles without coagulation).

It was apprehensive that, in the gas stream of a velocity sufficient to form a fluidized bed of coarse particles, such fine powder as 1-100 micrometers may easily blown away from the fluidized bed. However, our experiments proved that the fine powder stays for a relatively long period of time in the fluidized bed. The residence time is so long as 100 times or longer than the residence time given by calculation based on the requisites that the fine powder is simply exposed to the gas stream of the same velocity. Based on this fact it is considered that the fine powder charged in the fluidized bed of coarse particles adheres temporarily to the surfaces of the coarse particles and blown away therefrom after being calcined. The fine powder adhered to the surfaces of the coarse particles receive heat from both the coarse particles and the surrounding gas, and thus calcination or decomposition reaction rapidly proceeds.

Decarbonating reaction of limestone or decomposition reaction $CaCO_3 \rightarrow CaO+CO_2$ results in decrease in bulk density (from about 1.5 to 0.6-0.8) and thus, the fine powder after being calcined become so light that they tend to be carried away by the gas stream. The smaller the particles are the shorter the periods necessary for calcination are. In other words, the larger particles reside in the fluidized bed for longer periods of time to receive much heat for sufficient calcination.

Even in cases where coarse inert substance particles such as silica sand are used as the coarse particles, mutual collision thereof and collision of the coarse particles with the fine limestone powder cause abrasion of the coarse particles, and thus the particles which became smaller tend to be carried away from the fluidized bed. Therefore, replenishment of the coarse particles is necessary. The abrasion is, however, very feeble and the interval of the replenishment may be long.

On the other hand, in case where coarse particles of limestone are used as the coarse particles, they are calcined by the high temperature gas, broken down by their mutual collision and finally become fine powder, which are carried away by the gas stream. Therefore, in this case consumption of the particles which form the fluidized bed is relatively faster than in the case where the coarse inert substance particles are used, and replenishment must be done with relatively shorter intervals.

The present invention facilitates calcination of fine limestone powder without being suffered from mutual coagulation of the fine powder. The calcination can be carried out at a constant and relatively low temperature, and thus the method gives fine quicklime of high reactivity, which has a high value and wide use. Energy costs may be reduced by tactful heat exchange.

The present apparatus can be readily constructed based on solid/gas fluidizing technology.

EXAMPLE

An apparatus for fluidized bed calcining of the structure shown in FIG. 1 was constructed. A fluidizing-calcining tower 1 of a silica glass tube of inner diameter 5 cm and length 100 cm having a perforated plate 3 at the lower part thereof was installed. The gas-inlet 4 at the bottom of the tower was connected to a blower 71 and a preheater 72 which heats the air transferred by the blower, and the gas-outlet 5 at the top of the tower was connected to means for gas/solid separation which comprises a cyclone 81 and a bag filter 82, so that the gas may be released therethrough. Over the top of the tower there were installed means 6 for supplying fine limestone powder to the fluidized bed, which comprises a hopper 61, a screw feeder 62 and a lance pipe 63. Piping to the blower was so arranged that the pressure in the hopper may be a little higher than that of the atmosphere above the perforated plate. The fluidizing-calcining tower was held in a muffle 9 so as to keep the tower to a high temperature.

Silica sand 600 g having a particle size distribution of an averaged particle size 500 micrometers, 80% thereof being in the range of 400-600 micrometers,-was disposed on the perforated plate of the apparatus. A fluidized bed was formed by passing hot air through the tower at a linear gas velocity of 100 cm/sec.

Fine limestone powder having particle size distribution that the whole is in the range of 1-100 micrometers and the averaged particle size is 10 micrometers was fed to the tower at the rate of 30 g/min. for calcination. Calcination rate of the quicklime recovered by the solid/gas separator was such a high value as 98%. Here, "Calcination rate" is a percentage of the value obtained by dividing the number of CaO moles in the product with the number of CaO moles+unreacted $CaCO_3$ moles.

We claim:

1. A method of calcining relatively fine limestone powder comprising: forming a fluidized bed by fluidizing relatively coarse limestone particles in a particle range of 100-1500 micrometers with a gas of a temperature of at least 750° C.; charging continuously or intermittently relatively fine limestone powder in a particle range of 1-100 micrometers into the fluidized bed; replenishing the relatively coarse limestone particles in a particle range of 100-1500 micrometers to the fluidized bed as the relatively coarse limestone particles are consumed; and recovering a resulting relatively fine quicklime powder by separating the relatively fine quicklime powder from the gas coming from the fluidized bed with a solid/gas separator, wherein if one of the coarse limestone particles and the relatively fine limestone powder has a particle size of 100 micrometers, the other has a particle size of other than 100 micrometers.

2. A method of calcining according to claim 1, wherein coarse inert substance particles in a particle range of 100-1500 micrometers are also used in the fluidized bed.

3. A method of calcining according to claim 2, wherein silica sand is used as the coarse inert substance particles.

4. A method of calcining according to claim 1, wherein a gas of a temperature of at least 850° C. is used.

* * * * *